United States Patent
Rossini et al.

(10) Patent No.: US 9,910,277 B2
(45) Date of Patent: Mar. 6, 2018

(54) HEAD-UP DISPLAY

(71) Applicant: Commissariat à l'Energie Atomique et aux Energies Alternatives, Paris (FR)

(72) Inventors: Umberto Rossini, Coublevie (FR); Stéphane Getin, Grenoble (FR)

(73) Assignee: Commissariat a l'Energie Atomique at aux Energies Alternatives, Paris (FR)

( * ) Notice: Subject to any disclaimer, the term of this patent is extended or adjusted under 35 U.S.C. 154(b) by 0 days.

(21) Appl. No.: 14/902,127

(22) PCT Filed: Jul. 3, 2014

(86) PCT No.: PCT/FR2014/051712
§ 371 (c)(1),
(2) Date: Dec. 30, 2015

(87) PCT Pub. No.: WO2015/001265
PCT Pub. Date: Jan. 8, 2015

(65) Prior Publication Data
US 2016/0370585 A1    Dec. 22, 2016

(30) Foreign Application Priority Data

Jul. 4, 2013   (FR) ..................... 13 56555

(51) Int. Cl.
| | |
|---|---|
| *G02B 5/02* | (2006.01) |
| *G02B 27/01* | (2006.01) |
| *G02B 27/48* | (2006.01) |

(52) U.S. Cl.
CPC ........... *G02B 27/0101* (2013.01); *G02B 5/02* (2013.01); *G02B 27/0103* (2013.01); *G02B 27/0149* (2013.01); *G02B 27/48* (2013.01); *G02B 2027/015* (2013.01); *G02B 2027/0118* (2013.01); *G02B 2027/0123* (2013.01); *G02B 2027/0154* (2013.01); *G02B 2027/0161* (2013.01)

(58) Field of Classification Search
None
See application file for complete search history.

(56) References Cited

U.S. PATENT DOCUMENTS

| | | | | |
|---|---|---|---|---|
| 6,795,042 B1* | 9/2004 | Nagata | ............... | G02B 27/0172 345/15 |
| 2009/0279180 A1* | 11/2009 | Amitai | ................... | G02B 13/22 359/633 |

(Continued)

FOREIGN PATENT DOCUMENTS

| | | |
|---|---|---|
| DE | 10344684 A1 | 5/2005 |
| EP | 2570843 A1 | 3/2013 |

(Continued)

*Primary Examiner* — Kimberly N Kakalec
(74) *Attorney, Agent, or Firm* — The Noblitt Group, PLLC

(57) ABSTRACT

The invention concerns a head-up display, comprising at least one combination of a laser source, a movable mirror, a fixed mirror, a diffuser and an optical sub-system, the movable mirror being positioned to divert the beam originating from the laser source towards the fixed mirror in such a way that the beam from the fixed mirror scans the surface of the diffuser before reaching the optical sub-system.

14 Claims, 4 Drawing Sheets

(56) References Cited

U.S. PATENT DOCUMENTS

| | | | | |
|---|---|---|---|---|
| 2010/0033791 A1* | 2/2010 | Nakanishi | ............ | G02B 26/101 |
| | | | | 359/204.2 |
| 2010/0238685 A1* | 9/2010 | Huang | ................. | G02B 5/1814 |
| | | | | 362/607 |
| 2011/0096401 A1* | 4/2011 | Levola | ................. | G02B 6/0016 |
| | | | | 359/573 |
| 2011/0164294 A1* | 7/2011 | Shimizu | ............. | G02B 27/0172 |
| | | | | 359/13 |
| 2012/0127284 A1* | 5/2012 | Bar-Zeev | ............ | G02B 27/017 |
| | | | | 348/53 |
| 2012/0257282 A1* | 10/2012 | Hudman | ................. | G02B 5/04 |
| | | | | 359/619 |
| 2013/0063754 A1* | 3/2013 | Saisho | ............... | G02B 26/0858 |
| | | | | 358/1.13 |

FOREIGN PATENT DOCUMENTS

| | | |
|---|---|---|
| JP | 08-122737 A | 5/1996 |
| JP | 2009-163122 A | 7/2009 |
| WO | 2005121707 A2 | 12/2005 |

\* cited by examiner

HEAD-UP DISPLAY

The present patent application claims the priority benefit of French patent application FR13/56555 which is herein incorporated by reference.

BACKGROUND

The present invention relates to a head-up display.

DISCUSSION OF THE RELATED ART

Head-up displays, also known as HUDs, are augmented reality display systems which enable to integrate visual information on a real scene seen by an observer. In practice, such systems may be placed in a helmet visor, in the cockpit of a plane, or in the interior of a vehicle. They are thus positioned at a short distance from the user's eyes, for example, a few centimeters or tens of centimeters away.

FIG. 1 very schematically illustrates the operation of such a device.

A beam splitter 10 is placed between the eye of user 12 and a scene to be observed 14. The objects of the scene to be observed are generally located at infinity or at a long distance from the observer. Beam splitter 10 is for example placed according to a 45° angle relative to the axis between scene 14 and observer 12 to transmit the information originating from scene 14 to observer 12, without altering this information.

To project an image at infinity, like the real image of the scene, and to overlay it thereon, a projection system is provided. This system comprises an image display element 16, for example, a screen, located at the object focal point of an optical system 18. The image displayed on the screen is thus collimated to infinity by optical system 18. The user does not have to make any effort of accommodation, which limits his/her visual fatigue.

The projection system is for example placed perpendicularly to the axis between the scene and the observer so that the beam originating from optical system 18 reaches beam splitter 10 perpendicularly to this axis. The beam originating from optical system 18 thus reaches beam splitter 10 with a 45° angle relative to its surface.

Beam splitter 10 combines the image of scene 14 and the image originating from projection system 16-18, whereby observer 12 visualizes an image comprising the projected image overlaid on the image of scene 14.

To visualize the image projected by projection system 16-18, the observer's eye should be placed in the area of reflection of the beam originating from optical system 18 on splitter 10. An important constraint to be respected is to take into account the possible motions of the user's head in front of the projector, and thus to provide the largest possible beam at the exit of optical system 18. In other words, an optical system 18 having a large exit pupil, for example in the range from a few centimeters to a few tens of centimeters, should be provided, so that the observer's head motions do not cause a loss of the projected information.

Another constraint of head-up systems is that they should be relatively compact. Indeed, significant bulk constraints bear on these devices, particularly when they are used in plane cockpits or in the interior of vehicles of limited volume. To limit the bulk of head-up displays, devices having a decreased focal distance should thus be provided.

It is thus desired to obtain devices having a very small exit aperture, the exit aperture being defined as being the ratio of the object focal distance of the system to the diameter of the exit pupil of the device. The complexity of an optical system is known to depend on the exit aperture thereof. More particularly, the smaller the aperture of a device, the more complex the device. The more complex the optical system, the larger the number of optical elements that it contains, particularly to limit the different geometric aberrations. This increase in the number of elementary optical elements increases the volume and the cost of the complete device, which is not desired.

Further, it is necessary to provide devices having a low power consumption and a good visibility of the projected image, that is, a significant light intensity.

SUMMARY

An embodiment provides a head-up display which is particularly compact, consumes little power, and provides a significant light intensity of the projected image.

Thus, an embodiment provides a head-up display comprising a plurality of elementary display devices, each comprising a laser source, a mobile mirror, a fixed mirror, a diffuser, and an optical sub-system, the surface area of the diffuser being smaller than the surface area of the optical sub-system, and the mobile mirror being positioned to deviate the beam originating from the laser source towards the fixed mirror so that the beam originating from the fixed mirror scans the surface of the diffuser before reaching the optical sub-system, wherein the laser sources and the mobile mirrors are positioned in a space defined between the diffusers.

According to an embodiment, the elementary display devices are arranged so that the optical sub-systems are contiguous.

According to an embodiment, in each elementary display device, the diffuser is placed in the object focal plane of the optical sub-system.

According to an embodiment, in each elementary display device, the diffuser is a reflective diffuser.

According to an embodiment, in each elementary display device, the diffuser is a transmissive diffuser.

According to an embodiment, each elementary display device further comprises a diffraction grating arranged on the rear surface side of the diffuser, the grating being capable of orienting the central axis of the projection beam of the elementary display device towards the center of the optical sub-system of this elementary display device.

According to an embodiment, in each elementary display device, the diffuser is a holographic diffuser.

According to an embodiment, the display is intended to be used by an observer having his/her eye located at a distance e from the optical sub-systems, and has an eye box B and, in each elementary display device, the optical sub-system has a diameter Len and a focal distance f, and the diffuser has a dimension of approximately f*(Len+B)/e.

According to an embodiment, the elementary display devices are substantially identical, and neighboring diffusers are separated two by two by a distance approximately equal to Len−f*B/e.

According to an embodiment, at least one fixed mirror is common to a plurality of elementary display devices.

According to an embodiment, the display further comprises screen elements for the light beams between the different elementary display devices.

According to an embodiment, the display further comprises a general lens above the elementary display devices.

According to an embodiment, the mobile and fixed mirrors are planar.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings and, further, as usual in the representation of optical devices, the various drawings are not to scale.

DETAILED DESCRIPTION

To obtain a compact head-up display, that is, comprising a projection system having a bulk smaller than a few tens of centimeters and having an exit pupil of significant size, the projection system may be provided to be dissociated into a plurality of elementary projection sub-systems, each projection sub-system operating in the same way and projecting a portion of an image to be displayed overlaid to a real image.

Figure 2:
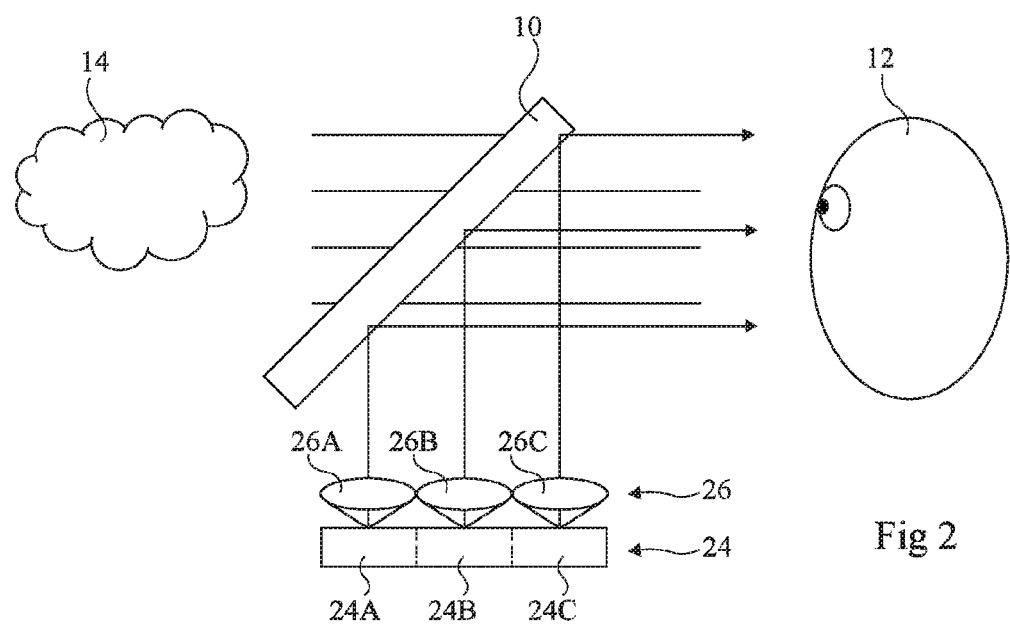
FIG. 2 illustrates another head-up display.

FIG. 2 schematically shows such a head-up display.

In FIG. 2, the device comprises a beam splitter 10 which is placed between observer 12 and a scene to be observed 14. The surface of beam splitter 10 forms an angle, for example, 45°, with the axis between the scene and the observer, and does not disturb the arrival of rays from the scene to the observer. It should be noted that the beam splitter may be replaced with an interference filter carrying out the same function as a beam splitter.

A system of projection of an image to be superposed to the image of the scene is provided. It comprises an image source 24, for example, a screen, associated with an optical system 26. The projection system is here placed perpendicularly to the axis between the scene and the observer, and the beam which originates from optical system 26 reaches beam splitter 10 perpendicularly to this axis.

Beam splitter 10 combines, that is, overlays, the image of scene 14 and the projected image originating from optical system 26, whereby the observer visualizes the projected image overlaid on the image of scene 14. The system of FIG. 2 thus operates in the same way as the system of FIG. 1.

Optical system 26 comprises an assembly of optical sub-systems 26A, 26B, and 26C of same object focal distance. Image source 24 is placed at a distance from optical system 26 equal to the object focal distance of each of optical sub-systems 26A to 26C.

The assembly formed of a sub-screen (or of a light source) and of an optical sub-system will be called sub-projector herein. The projection system thus comprises a plurality of sub-projectors.

To form image source 24, a screen divided into a plurality of sub-screens may be used. In the cross-section view of FIG. 2, three sub-screens 24A, 24B, and 24C are shown. Each sub-screen 24A, 24B, and 24C is associated with an optical sub-system 26A, 26B, 26C. Unlike what is shown, the sub-screens may be offset from the optical axes of the associated optical sub-systems.

Screen 24 is provided so that each sub-screen 24A, 24B, 24C displays part of the information, the complete information being recombined by the optical system at the level of the observer's eye. To achieve this, the image which is desired to be projected in augmented reality is divided into blocks which are distributed on the different sub-screens.

By forming a plurality of parallel sub-projectors, a complete device having a large total exit pupil (sum of the sizes of the exit pupils of each of the sub-projectors) may be obtained, while forming simple and compact optical sub-systems.

Indeed, each optical sub-system has a "moderate" so-called elementary aperture. The elementary aperture of an optical sub-system is defined as being the ratio of its specific focal distance to the dimension of its specific exit pupil. The parallel association of the sub-projectors thus provides an optical system having a particularly large aperture since, for a same distance between the screen and the projection optical element, a total exit pupil of significant size, equal to the sum of the exit pupils of each optical sub-system, is obtained. The optical system thus has a small aperture while being formed of simple elementary optical structures of moderate apertures (relatively large). The compactness of the complete device is thus ensured.

It is current to form projection screens by means of an array of cells comprising organic light-emitting diodes (OLED) or also of LCD or cathode screens.

However, such screen structures do not enable to form images having a high light intensity, which may be important in head-up displays. Indeed, in use in car or plane passenger compartments, the outside luminosity may be very high, which imposes the projection of information in augmented reality with a high intensity so that the projected information remains visible. The luminosity of the device may for example be imposed to be in the order of 60,000 $cd/m^2$. Such a light intensity cannot be achieved by means of OLED, LCD, or cathode screens.

Thus, to ensure the forming of images having high light intensities, a head-up display comprising sub-projectors formed by means of a laser source scanning a display device comprising a diffuser rather than based on light display screens of LCD screen, cathode screen, or LED or OLED screen type is here provided. The detail of embodiments will be described hereafter.

Figure 3:
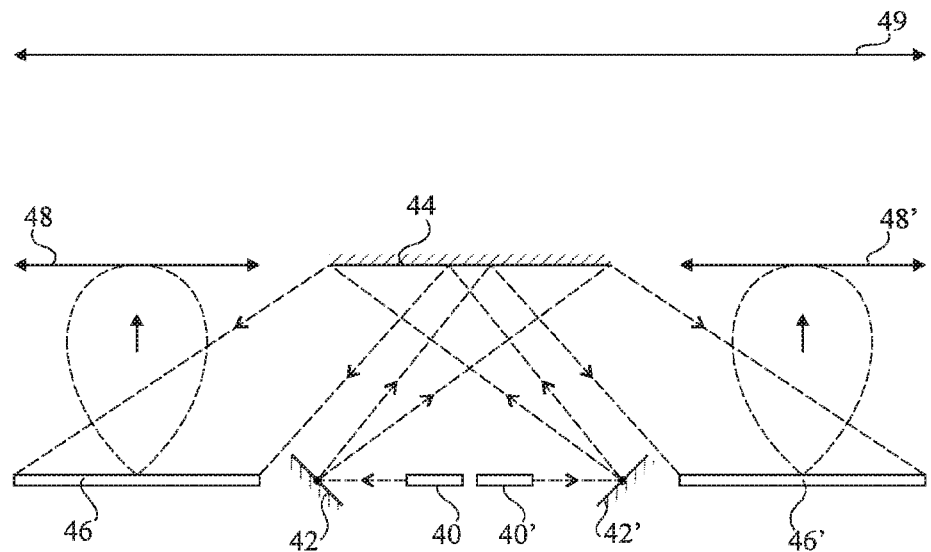
FIG. 3 illustrates a portion of a head-up display according to an embodiment.
Figure 4:
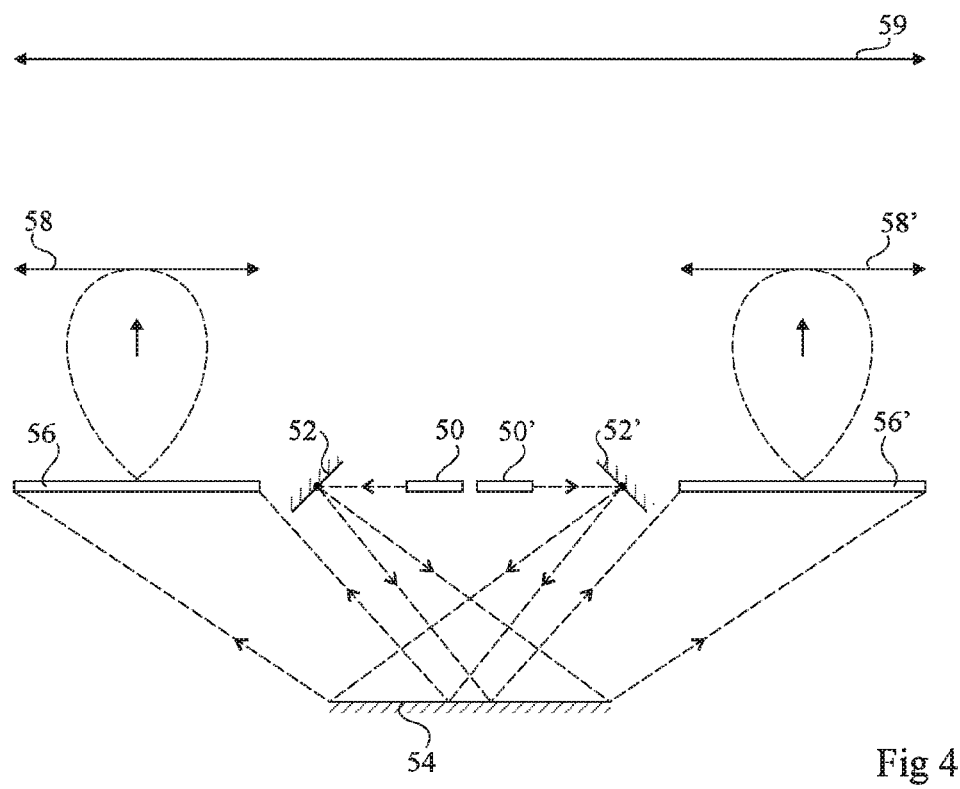
FIG. 4 illustrates a portion of a head-up display according to an alternative embodiment.

FIGS. 3 and 4 schematically illustrate portions of head-up displays according to two alternative embodiments. More specifically, these two drawings schematically illustrate a plurality of sub-projectors of head-up displays according to two embodiments.

In the variation of FIG. 3, the device comprises at least two lasers 40 and 40', these two lasers being placed head-to-tail in the plane of the drawing. Lasers 40 and 40' are directed towards opposite directions. A mobile planar mirror 42 is placed on the path of laser 40 and a mobile planar mirror 42' is placed on the path of laser 40'. A fixed planar mirror 44 is placed above the assembly formed of lasers 40 and 40', its reflective surface facing lasers 40 and 40'.

The device further comprises two reflective diffusers 46 and 46', in the shown example placed in the same plane as lasers 40 and 40' on either side thereof. In this example, diffuser 46 is placed on the side of laser 40 and diffuser 46' is placed on the side of laser 40'. A lens 48, respectively 48', is placed above and opposite diffuser 46, respectively 46'. Lenses 48 and 48' may be convex. Diffuser 46 is in the focal plane of lens 48 (or of the exit object, see hereafter), and diffuser 46' is in the focal plane of lens 48' (or of the exit lens, see hereafter).

Mobile planar mirrors 42 and 42' are shown in FIG. 3 as being placed with an appropriate angle, for example, 45°, with respect to the projection axis of lasers 40 and 40' to direct the laser beam upwards in FIG. 3, towards planar mirror 44. In a central position of mobile mirrors 42 and 42', these mirrors are provided to deviate each of the beams originating from lasers 40 and 40' towards the middle of one half of mirror 44. Mirrors 42 and 42' are movably assembled, for example, rotatably around two axes, so that the laser beam originating from source 40, respectively 40', scans at least part of the surface of mirror 44 (in the shown example, half of this surface) and is reflected by planar mirror 44 to scan the surface of diffuser 46', respectively 46. The beam is then reflected and diffused by diffusers 46, respectively 46', towards the associated lens 48, respectively 48'.

Thus, the motion of mobile mirror 42, respectively 42', is provided so that the laser beam originating from source 40, respectively 40', scans the entire surface of reflection diffuser 46', respectively 46. The laser beam originating from sources 40 and 40' is configured to exhibit a light intensity modulation according to the location of the laser projection onto the corresponding portion of the diffuser to define a portion at least of the image to be displayed at the device output.

A general lens 49 may be provided at the device output, that is, after lenses 48 and 48', on the path of the laser beams, if necessary. General lens 49 has a surface area corresponding to all the optical sub-systems (e.g., lenses 48 and 48') together, and may be a lightly-convex plate. In the case where a general lens 49 is provided, lenses 48 and 48' form with general lens 49 an exit lens, diffusers 46 and 46' being then placed in the object focal plane of this lens. A beam splitter, not shown, or another optical device combining the real image with the projected image, is further placed opposite the exit lens to ensure the head-up display function.

The assembly comprises lenses 48, 48' and general exit lens 49 of the device provides an image at infinity to an observer of diffusers 46 and 46'.

In the variation of FIG. 4, the device also comprises at least two lasers 50 and 50', these two lasers being placed head-to-tail in the plane of the drawing. Lasers 50 and 50' are directed towards opposite directions. A mobile planar mirror 52 is placed on the path of laser 50 and a mobile planar mirror 52' is placed on the path of laser 50'. A planar mirror 54 is placed, this time, under the assembly formed of lasers 50 and 50', its reflective surface facing the lasers.

The device further comprises two transmissive diffusers 56 and 56', in the shown example placed in the same plane as lasers 50 and 50' on either side thereof. In this example, diffuser 56 is placed on the side of laser 50 and diffuser 56' is placed on the side of laser 50'. A lens 58, respectively 58', is placed above diffuser 56, respectively 56'. Diffuser 56 is in the focal plane of lens 58 (or of the exit lens, see hereafter), and diffuser 56' is in the focal plane of lens 58' (or of the exit lens, see hereafter).

Mobile planar mirrors 52 and 52' are shown in FIG. 4 as being placed with an appropriate angle, for example, 45°, with respect to the projection axis of lasers 50 and 50' to direct the laser beam downwards in FIG. 4, towards planar mirror 54. In a central position of mobile mirrors 52 and 52', these mirrors are provided to deviate each of the beams originating from lasers 50 and 50' towards the middle of a portion of mirror 54. Mirrors 52 and 52' are movably assembled, for example, rotatably around two axes, so that the laser beam originating from source 50, respectively 50', scans at least part of the surface of mirror 54 (in the shown example, half of mirror 54) and is reflected by planar mirror 54 to scan the surface of diffuser 56', respectively 56. The beam is then transmitted and diffused by transmissive diffusers 56, respectively 56', towards the associated lens 58, respectively 58'.

Thus, the motion of mobile mirror 52, respectively 52', is provided so that the laser beam originating from source 50, respectively 50', scans the entire surface of reflection diffuser 56', respectively 56. The laser beam originating from sources 50 and 50' is configured to exhibit a light intensity modulation according to the projection location of the laser onto the corresponding portion of the diffuser to define a portion at least of the image to be displayed at the device output.

Mirrors 52 and 52' (or 42 and 42' in the example of FIG. 3) are for example formed in MEMS technology ("Micro-ElectroMechanical Systems"). The angular range or excursion of each mirror is for example approximately 36 degrees in each direction around the horizontal rotation axis and approximately 27 degrees in each direction around the vertical rotation axis. This is of course an example only.

It should be noted that a general lens 59 may be provided at the device output, that is, after lenses 58 and 58', on the path of the laser beams, if necessary. General lens 59 has a surface area corresponding to all the optical sub-systems (e.g., lenses 58 and 58'), and may be a lightly-convex blade. In the case where a general lens 59 is provided, lenses 58 and 58' form with general lens 59 an exit lens, diffusers 56 and 56' being then placed in the object focal plane of this lens. A beam splitter, not shown, or another optical device combining the real image with the projected image, is further placed opposite the exit lens to ensure the head-up display function.

Although the embodiments of FIGS. 3 and 4 have been described as comprising two associations, in a same plane, of a laser, of a mobile mirror, of a fixed mirror, and of a lens, devices comprising more or less than two associations of this type may of course be provided. Head-up displays where blocks of four associations of this type are provided may in particular be provided, the lasers being for example regularly distributed in a same plane. A plurality of blocks, each comprising a plurality of associations of this type, may also be placed in parallel to form a device having an exit aperture of adapted dimensions.

Figure 5:
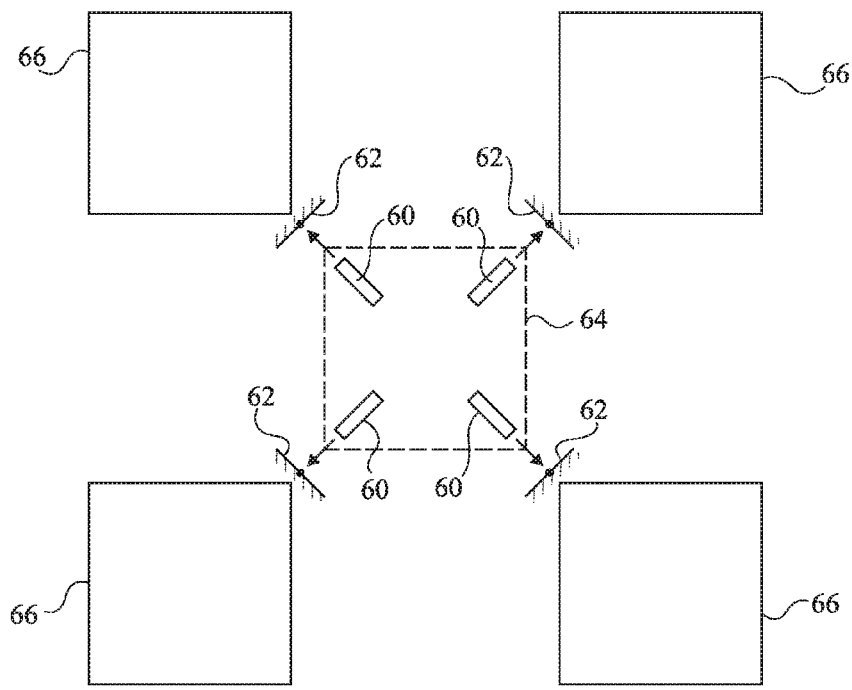
FIG. 5 is a top view of a portion of a head-up display according to an embodiment.

FIG. 5 is a simplified top view illustrating a device comprising a central optical block formed of four lasers associated with four optical systems ensuring the forming of an image.

In top view, the device comprises four laser sources 60, each in a direction orthogonal to the two neighboring laser sources. The beams are directed towards the outside of all the sources. A rotatable reflective mirror 62, allowing the reflection of the laser beams on planar mirror 64, shown in dotted lines and of square shape, is provided on the path of each laser source. In top view, planar mirror 64 is positioned substantially opposite the four laser sources 60. Diffusers 66 are placed, in top view, at each angle of mirror 64. Individual and general lenses, positioned at the output of the head-up display (not shown in FIG. 5) may be provided.

It should be noted that, in the simplified top view of FIG. 5, the case where mirror 64 is placed above the lasers (on the side of the optical exit of the head-up display), diffusers 66 then being reflective diffusers, has not been distinguished from the case where mirror 64 is placed under the lasers, diffusers 66 then being transmissive diffusers (the two variations of FIGS. 3 and 4).

Advantageously, the integration of blocks comprising the laser sources as well as mobile and fixed mirrors between each elementary display device (formed of a diffuser and of a lens) ensures the forming of a particularly compact device. Further, the use of modulated laser sources provides light intensities at the display output adapted to the targeted applications, while providing a low power consumption.

Figure 6:
FIG. 6 illustrates a portion of a head-up display according to another alternative embodiment.
Figure 6:
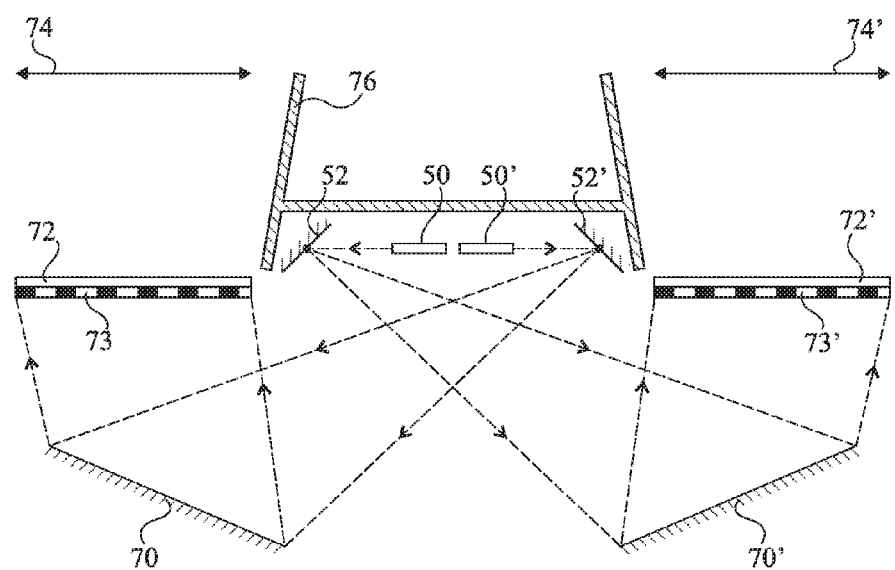

FIG. 6 illustrates a head-up display according to an alternative embodiment. It should be noted that the variation of FIG. 6 is shown with transmissive diffusers, but that similar structures may be provided with reflective diffusers.

The device of FIG. 6 comprises, in the plane of the drawing and in the same way as in the device of FIG. 4, laser sources 50 and 50' placed head-to-tail and illuminating in opposite directions. A mobile mirror 52 is placed on the illumination path of laser 50 and a mobile mirror 52' is placed on the illumination path of laser 50'. Mobile mirror 52, placed to the left of laser 50 in the drawing, deviates the laser beam from source 50 downwards and rightwards, towards a fixed mirror 70' placed under a transmissive diffuser 72'. Mobile mirror 52', placed to the right of laser 50' in the drawing, deviates the laser beam from source 50' downwards and leftwards, towards a fixed mirror 70 placed under a transmissive diffuser 72. Conversely to the case of FIG. 4, mirrors 70 and 70' are placed obliquely under diffusers 72 and 72'.

Mirror 70 is provided to deviate the beam that it receives from source 50' towards transmissive diffuser 72 and mirror 70' is provided to deviate the beam that it receives from source 50 towards transmissive diffuser 72'. Two lenses 74 and 74' (i.e., the optical sub-system) are provided above, respectively, transmissive diffusers 72 and 72'. The distance separating lens 74, respectively 74', and transmissive diffuser 72, respectively 72', is equal to the focal distance of lens 74, respectively 74'. A general exit lens 79 is also provided. Diffusers 72 and 72' are placed in the object focal plane of the lens formed by lenses 74 and 74' and by general lens 79.

Thus, the variation of FIG. 6 differs from the variation of FIG. 4 in that the device comprises, rather than a single planar mirror 54, two planar mirrors 70 and 70' positioned to reflect the beam originating from the mobile mirrors towards the diffusers. Further, as shown in FIG. 6, diffusers 72 and 72' may be placed in a plane different from the plane of laser sources 50, 50' and of mobile mirrors 52, 52'.

FIG. 6 also illustrates an alternative embodiment compatible with the devices comprising reflective or transmissive diffusers of FIGS. 3 and 4. The device of FIG. 6 has screen elements 76, ensuring the separation of the laser beams originating from the different diffusers and from the laser sources, provided therein. In practice, screen elements 76 are positioned above the laser sources and on either side of the diffusers. This solution enables to use diffusers having lower directional constraints than previously.

Indeed, in the case where delimitation walls 76 are not provided, the diffusers should be correctly selected to avoid diffusing according to too significant angles and towards the associated lens.

It should be noted that in the above-described embodiments and variations thereof, the selection of transmissive or reflective diffusers to provide diffusion angles adapted to the forming of the display provided herein are within the abilities of those skilled in the art and will not be described in detail herein. The diffusers may be holographic or not. As an example, the diffusers may be formed of a Fresnel lens having a mirror (non-holographic diffuser) provided on its rear surface; such a structure ensures the diffusion of the information according to a predetermined angle by the lens. As a variation, the transmissive diffusers may be diffusers available for sale, known under acronym LSD (Light Shaping Diffusers) and commercialized by Luminit, or also a double array with a plurality of lenses known as MLA (Multi Lens Array), for example, the device known under acronym EPE (Exit Pupil Expander) commercialized by Microvision (holographic diffuser). Other structures may be used to form the reflective or transmissive diffusers provided herein. Particular, structures limiting the speckle may also be provided in the diffusers or at the surface thereof. Granular structures may generally be used to form the diffusers, the granularity being adapted to control diffusion effects. Further, diffusers having volume holograms provided therein, for example, in the form of Bragg mirrors inserted in the thickness of a plate may also be provided. It should be noted that current diffusers provide strong reflection or transmission rates, which provides a low loss in optical signals.

Advantageously, the devices provided herein may have an exit pupil in the order of 140 mm while keeping a maximum compactness of the device (distance according to the exit optical axis of the device) in the order of 100 mm. Indeed, there currently exist color lasers having a bulk which does not exceed 1.5 cm³, which ensures an integration in small volumes. Further, such lasers have particularly low power consumption characteristics.

As an example of numerical application, the distance between diffusers may be 51.8 mm, the diffusers may extend across dimensions in the order of 31.3 mm, the distance between the diffusers and the main exit lens of the device may be in the order of 100 mm, and the angular clearance of the mobile mirrors may be 20°.

Figure 7:
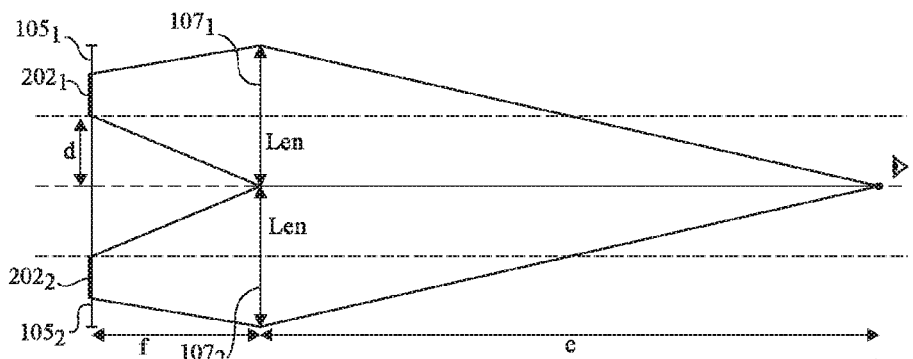
FIGS. 7, 8, and 9 illustrate examples of geometric rules for the design of a head-up display.
Figure 8:
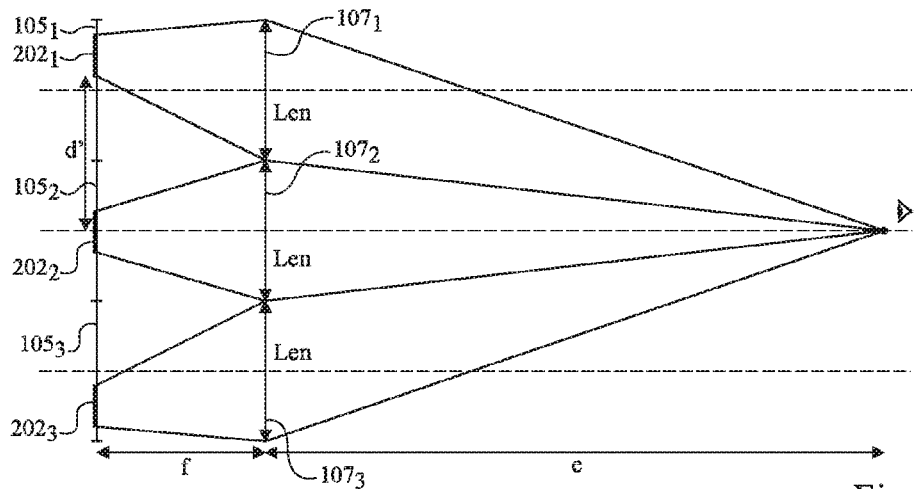
Figure 9:
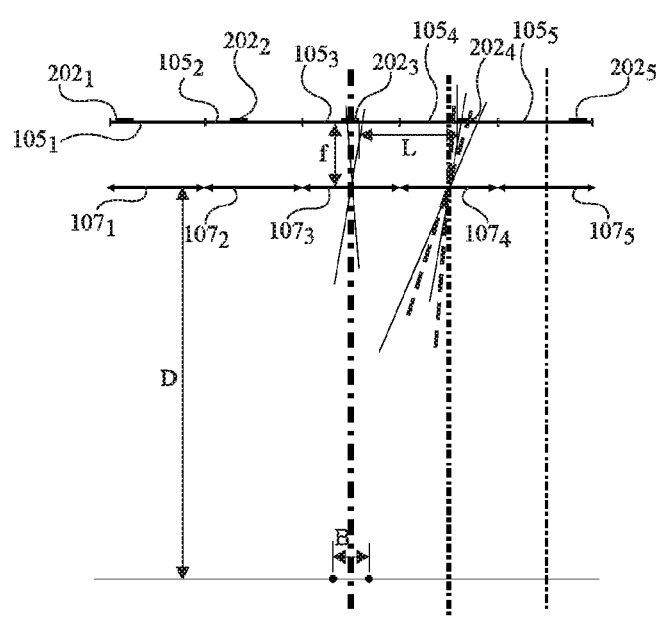

FIGS. 7, 8, and 9 illustrate examples of geometric rules enabling to better understand the operation of a device of the type described in relation with FIGS. 3 to 5.

In FIG. 7, an optical structure comprising two sub-screens $105_1$ and $105_2$ (for example, diffusers 46, 46', 56, 56', 66, 72, 72' of the examples of FIGS. 3 to 6) placed in a same plane, respectively opposite optical sub-systems $107_1$ and $107_2$ (for example, lenses 48, 48', 58, 58', 74, 74' of the examples of FIGS. 3 to 6) is considered. In this example, sub-screens $105_1$ and $105_2$ are placed in the object focal plane of optical sub-systems $107_1$ and $107_2$. Sub-screens $105_1$ and $105_2$ and optical sub-systems $107_1$ and $107_2$ extend symmetrically on either side of the main optical axis of the structure.

This drawing aims at showing the surface of each pixel sub-assembly effectively seen by the user when the optical axis of the eye coincides with the main optical axis of the structure, and when the user's eye is at a distance e from optical sub-systems $107_1$ and $107_2$.

As shown in FIG. 7, only a portion $202_1$ of sub-screen $105_1$ and a portion $202_2$ of sub-screen $105_2$ are seen by the user's eye. Thus, considering an observer having a still eye such as in FIG. 7, only portions $202_1$ and $202_2$ of sub-screens $105_1$ and $105_2$ are useful for the observation. The rest of the sub-screens may be deactivated or, also, the sub-screens may be reduced to their portions $202_1$ and $202_2$ only, for a same visibility of the information.

Useful portions $202_1$ and $202_2$ of sub-screens $105_1$ and $105_2$ have a dimension approximately equal to f*Len/e, Len being the diameter of optical sub-systems $107_1$ and $107_2$. The edges of useful portions $202_1$ and $202_2$ of sub-screens $105_1$ and $105_2$ are located at a distance d approximately equal to Len/2 from the main optical axis of the structure. The edge-to-edge distance between useful portions $202_1$ and $202_2$ of sub-screens $105_1$ and $105_2$ is approximately equal to diameter Len of the optical sub-systems.

In FIG. 8, a structure comprising three sub-screens $105_1$, $105_2$, and $105_3$, placed in a same plane, respectively in front of optical sub-systems $107_1$, $107_2$, and $107_3$, is considered. In this example, sub-screens $105_1$, $105_2$, and $105_3$ are placed in the object focal plane of optical sub-systems $107_1$, $107_2$, and $107_3$. The central sub-display, formed by sub-screen $105_2$ and optical sub-system $107_2$, has its optical axis confounded with the main optical axis of the structure, and the peripheral sub-displays extend on either side of the central sub-display, symmetrically with respect to the main optical axis of the structure.

The case where the optical axis of the user's eye coincides with the main optical axis of the structure and where the user's eye is at a distance e from central optical sub-system $107_2$ is considered.

As shown in FIG. 8, only a portion $202_1$ of sub-screen $105_1$, a portion $202_2$ of sub-screen $105_2$, and a portion $202_3$ of sub-screen $105_3$ are visible by the eye. Thus, considering an observer having a still eye such as in FIG. 8, only portions $202_1$, $202_2$, and $202_3$ and of sub-screens $105_1$, $105_2$, and $105_3$ are useful for the observation. The rest of the sub-screens may be deactivated or, also, the sub-screens (for example, diffusers) may be reduced to their portions $202_1$, $202_2$, and $202_3$ only, for a same visibility of the information.

Useful portions $202_1$, $202_2$, and $203_3$ of sub-screens $105_1$, $105_2$, and $105_3$ have a dimension substantially equal to f*Len/e, Len being the diameter of optical sub-systems $107_1$, $107_2$, and $107_3$. Useful portion $202_2$ of the central sub-display is centered on the main optical axis of the structure, and the edges of useful portions $202_1$ and $202_3$ of the peripheral sub-displays are located at a distance d' substantially equal to Len+f*Len/2e from the main optical axis of the structure. The edge-to-edge distance between useful portions $202_1$ and $202_2$ on the one hand, and $202_2$ and $202_3$ on the other hand, is approximately equal to diameter Len of the optical sub-systems.

More generally, whatever the position of a sub-display in a display comprising an even or odd number of sub-displays, the useful portion of the elementary image source of this sub-display (visible for a given eye position) has a dimension approximately equal to f*Len/e.

The image which is desired to be displayed in augmented reality may be divided into blocks which are distributed between the different sub-displays according to the position of each sub-display relative to the main optical axis of the complete display. Sub-displays at the periphery of the display are useful to display peripheral portions of the image, and sub-displays at the center of the display are useful to display central portions of the image.

In practice, to define the useful surface of each of the sub-screens in operation, account should also be taken of the fact that the user's eye is likely to move, according to a maximum amplitude which is predefined. The case of an exclusively lateral eye motion is considered hereafter as an example. However, the described teachings also apply to a vertical eye motion.

The space where the observer's eye can move while receiving the entire information is called "eye box". The positioning and the size of sub-screens $105_i$ may be adapted according to a predefined desired eye box. Hereafter, the maximum accepted eye motion amplitude, equal to the size of the eye box, will be called B.

FIG. 9 illustrates a structure comprising a number Q=5 of sub-displays, each comprising a sub-screen (respectively $105_1$, $105_2$, $105_3$, $105_4$, and $105_5$) facing an optical sub-system (respectively $107_1$, $107_2$, $107_3$, $107_4$, and $107_5$). Each sub-screen $105_i$ has, in this example, a length approximately equal to Len, and is centered on the optical axis of the optical sub-system $107_i$ associated therewith. In this example, sub-screens $105_i$ are placed in the object focal plane of optical sub-systems $107_i$.

In the case of a zero eye box size B (the smallest motion of the observer's head implies a loss of information), it has been seen hereabove that useful portions $202_i$ of sub-screens $105_i$ have a length approximately equal to f*Len/e and are distant by an edge-to-edge distance approximately equal to Len (the centers of useful portions $202_i$ are thus distant by approximately Len+f*Len/e).

In the case of a non-zero eye box size B, the visible portion of each sub-screen $105_i$, of dimension f*Len/e, displaces when the eye displaces in the eye box. In FIG. 9, full lines delimit the focal plane area visible when the eye moves leftwards in the drawing by a distance B/2 and dotted lines delimit the focal plane area visible when the eye moves rightwards in the drawing by a distance B/2. If a complete image is desired to be seen whatever the eye position in the eye box, the image should be displayed on portions of sub-screens $105_i$ positioned and sized to correspond to the overlapping area of the visible regions at both ends of the eye box. Thus, "useful" portions $202_i$ of sub-screens $105_i$ should be enlarged by a length f*B/2e to the left and by a length f*B/2e to the right with respect to the case of a zero eye box size. In other words, for each sub-screen $105_i$, for a given eye position in the eye box, the portion of sub-screen $105_i$ visible by the user's eye has a dimension in the order of f*Len/e and, when the eye scans the entire eye box space, the useful portion of sub-screen $105_i$ which is seen (scanned) by the eye has a dimension of approximately f*Len/e+f*B/e. For a same visibility of the information, the rest of sub-screen $105_i$ may be disconnected, or the sub-screen may be reduced to its useful portion $202_i$ of length f*(Len+B)/e only (the edge-to-edge distance of useful portions $202_i$ is then smaller than Len).

In the embodiments and variations described hereabove in relation with FIGS. 3 to 6, the diffusers are reduced to their useful portions only, having their dimensions determined according to the rules discussed in relation with FIGS. 7 to 9. Advantage is then taken from the space left free between the useful portions of the diffusers to place the laser sources enabling to display the image.

More particularly, in the above-described embodiments, in each elementary display device comprising a diffuser and a lens, the diffuser is reduced to its useful portion only, and thus has a surface area smaller than the surface area of the lens (the diffuser surface area being determined according to the rules discussed in relation with FIGS. 7 to 9). Advantage is then taken from the space left free between the diffusers to arrange, substantially in the same plane as the diffusers and/or in an intermediate plane between the diffusers and the lenses, elements of the image projection device, for example, the laser sources enabling to display the image and/or the mirrors of the projection device. This especially enables to limit the bulk of the display in the direction of the main optical axis of the image projection system.

Figure 1:
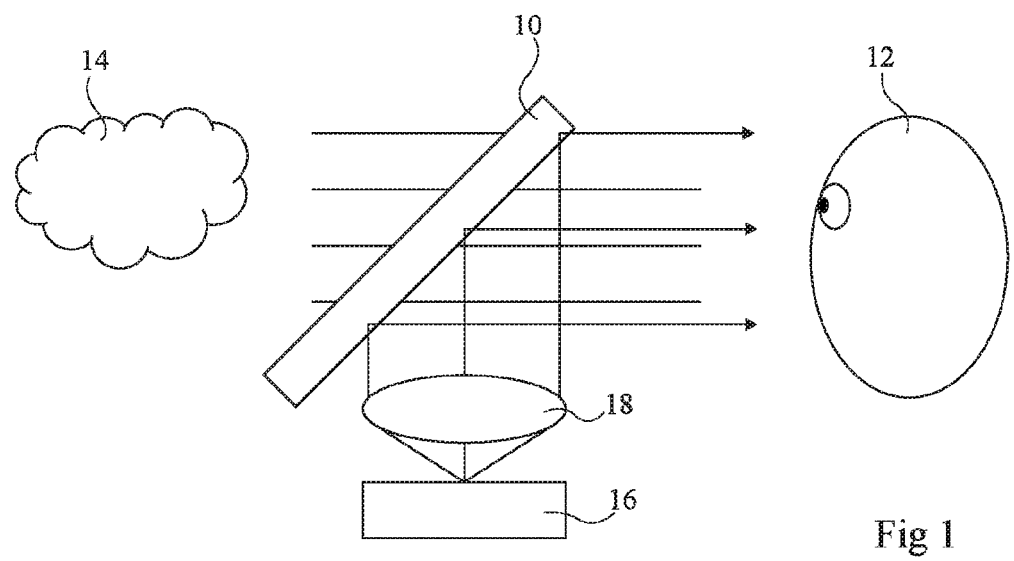
FIG. 1, previously described, illustrates the operating principle of a head-up display.

Preferably, as shown in FIGS. 7 to 9, the lenses of the different elementary display devices are contiguous (seen from the observer's side) to obtain, at the output of the multi-pupil optical system, a continuous exit pupil, equivalent to that of a single-pupil optical system of the type described in relation with FIG. 1. "Contiguous" here means that the lenses are juxtaposed, or separated by a distance such that the ratio of the distance between lenses on the observation distance is smaller than 0.3 mrad. The observation distance is for example in the range from 0.5 to 2.5 meters.

It should be noted that, in the above-described embodiments, in certain elementary display devices, the diffuser may be offset with respect to the lens, that is, the center of the diffuser may be offset with respect to the main optical axis of the lens (as shown, in particular, in FIGS. 7 to 9). Advantageously, in the case where the diffuser is a transmissive diffuser, it is provided to arrange, on the rear surface side of the diffuser, that is, on the laser source side, a diffraction grating 73, respectively 73', for example, a blazed grating, capable of redirecting the image projection beam towards the lens, before the passing of the beam through the diffuser. The diffraction grating 73, 73' is for example capable of redirecting the central axis of the projection beam of the elementary display device towards the center of the lens of this display device. The main axis of the diffusion lobe at the diffuser exit is then directed towards the center of the lens, which improves the light efficiency of the device. The diffraction grating 73, 73' is for example appended to the rear surface of the diffuser.

Various embodiments with different variations have been described hereabove. It should be noted that those skilled in the art may combine various elements of these various embodiments and variations without showing any inventive step.

Particularly, although mobile and fixed planar mirrors have been described herein, similar devices may be provided with curved mirrors, for example, spherical mirrors. The motion of the mobile mirrors will be accordingly adapted to obtain the operation provided herein.

Mobile mirrors are currently available for sale, driven by any type of actuator, for example, a motor. The selection of the actuator ensuring the motion of the mobile mirror will not be described in further detail herein.

Further, displays where a plurality of blocks are provided have been described herein, each block comprising a laser source, a mobile mirror, a fixed mirror, a diffuser, and a convex lens, each block being similar to the neighboring blocks. It should be noted that, if desired, different blocks may be associated in a same head-up display. Exit lenses having different focal distances between the different blocks may in particular be provided, diffusers having different dimensions between the different blocks, especially to compensate for effects which appear between the center and the periphery of the display or to take into account the possible motions of the user's eyes in front of the display.

The invention claimed is:

1. A head-up display comprising:
a plurality of elementary display devices, each comprising:
a laser source;
a mobile mirror, not common to another elementary display device;
a fixed mirror;
a diffuser; and
a lens,
the lens positioned adjacent to a front surface side of the diffuser and a surface area of the diffuser being smaller than a surface area of the lens, and the mobile mirror being positioned to deviate a beam originating from the laser source towards the fixed mirror so that the beam originating from the fixed mirror scans a surface of the diffuser before reaching the lens,
wherein the diffusers are in a same first plane and the lenses are in a same second plane parallel to the first plane, and wherein the laser sources and the mobile mirrors are positioned in a space defined between the diffusers.

2. The head-up display of claim 1, wherein the elementary display devices are arranged so that the lenses are contiguous.

3. The head-up display of claim 1, wherein, in each elementary display device, the diffuser is placed in the object focal plane of the lens.

4. The head-up display of claim 1, wherein, in each elementary display device, the diffuser is a reflective diffuser.

5. The head-up display of claim 1, wherein, in each elementary display device, the diffuser is a transmissive diffuser.

6. The head-up display of claim 5, wherein each elementary display device further comprises a diffraction grating arranged on a rear surface side of the diffuser, the grating being capable of orienting a central axis of a projection beam of the elementary display device towards a center of the lens of this elementary display device.

7. The head-up display of claim 1, wherein, in each elementary display device, the diffuser is a holographic diffuser.

8. The head-up display of claim 1, intended to be used by an observer having his/her eye located at a distance e from the lenses, and having an eye box B, wherein, in each elementary display device, the lens has a diameter Len and a focal distance f, and the diffuser has a dimension of approximately f*(Len+B)/e.

9. The head-up display of claim 8, wherein the elementary display devices are substantially identical, and neighboring diffusers are separated two by two by a distance approximately equal to Len−f*B/e.

10. The head-up display of claim 1, wherein at least one fixed mirror is common to a plurality of elementary display devices.

11. The head-up display of claim 1, further comprising screen elements for the light beams between the different elementary display devices.

12. The head-up display of claim 1, further comprising a general lens above said elementary display devices.

13. The head-up display of claim 1, wherein the mobile and fixed mirrors are planar.

14. The head-up display of claim 1, wherein the plurality of elementary display devices comprises at least three elementary display devices.

* * * * *

UNITED STATES PATENT AND TRADEMARK OFFICE
CERTIFICATE OF CORRECTION

PATENT NO. : 9,910,277 B2
APPLICATION NO. : 14/902127
DATED : March 6, 2018
INVENTOR(S) : Umberto Rossini Page 1 of 1

It is certified that error appears in the above-identified patent and that said Letters Patent is hereby corrected as shown below:

On the Title Page

The name of the Assignee:
Please delete:
"COMMISSARIAT À L'ENERGIE ATOMIQUE AT AUX ENERGIES ALTERNATIVES, Paris (FR)"
And insert:
--COMMISSARIAT À L'ENERGIE ATOMIQUE ET AUX ENERGIES ALTERNATIVES, Paris (FR)--

Signed and Sealed this
First Day of May, 2018

Andrei Iancu
*Director of the United States Patent and Trademark Office*